United States Patent
Ma et al.

(10) Patent No.: US 6,885,621 B2
(45) Date of Patent: Apr. 26, 2005

(54) ERROR SIGNAL DETECTION APPARATUS AND METHOD FOR OPTICAL RECORDING/REPRODUCING SYSTEM INCLUDING COMPARING PHASES OF SUM SIGNALS

(75) Inventors: Byung-In Ma, Suwon (KR); Byoung-ho Choi, Suwon (KR); Chong-sam Chung, Suwon (KR); In-sik Park, Suwon (KR); Tae-yong Doh, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 09/844,697

(22) Filed: Apr. 30, 2001

(65) Prior Publication Data

US 2002/0006091 A1 Jan. 17, 2002

(30) Foreign Application Priority Data

Apr. 28, 2000 (KR) .................................. 2000-22804

(51) Int. Cl.[7] ................................................ G11B 7/00
(52) U.S. Cl. .......................... 369/53.19; 369/44.41; 369/44.32
(58) Field of Search .................... 369/44.32, 44.41, 369/44.42, 53.12, 53.19, 53.28, 53.23

(56) References Cited

U.S. PATENT DOCUMENTS

| 5,523,989 A | 6/1996 | Ishibashi |
| 5,978,332 A | 11/1999 | Itakura et al. |
| 6,507,544 B1 * | 1/2003 | Ma et al. ................ 369/44.32 |
| 6,510,111 B1 * | 1/2003 | Matsuura ................ 369/53.19 |

FOREIGN PATENT DOCUMENTS

| EP | 357 323 | 3/1990 |
| EP | 953 974 | 11/1999 |

* cited by examiner

Primary Examiner—David L. Ometz
Assistant Examiner—Jorge L. Ortiz-Criado
(74) Attorney, Agent, or Firm—Stein, McEwen & Bui, LLP

(57) ABSTRACT

An error signal detection method and apparatus for an optical recording/reproducing system. The error signal detection method includes: (a) detecting light incident through an objective lens after having been reflected and diffracted from a recording medium, as eight light portions arranged in a 2×4 matrix, including four inner light portions, and four outer light portions around the corresponding inner light portions, wherein the rows and columns of the matrix are parallel to the tangential and radial direction of the recording medium, respectively; (b) calculating a first sum signal by summing a detection signal from at least one outer light portion located in a first diagonal direction, and a detection signal from an inner light portion located in a second diagonal direction; (c) calculating second sum signal by summing a detection signal from an inner light portion located in the first diagonal direction, and a detection signal from an outer light portion located in the second diagonal direction; and (d) comparing phases of the first and second sum signals and outputting a phase comparison signal, wherein a tilt error signal is detected from the phase comparison signal. The tilt error signal detected using the method by the error signal detection apparatus has a high signal-to-noise ratio, and is less affected by detracting.

45 Claims, 14 Drawing Sheets

PRIOR ART

ERROR SIGNAL DETECTION APPARATUS AND METHOD FOR OPTICAL RECORDING/REPRODUCING SYSTEM INCLUDING COMPARING PHASES OF SUM SIGNALS

CROSS-REFERENCE TO RELATED APPLICATIONS

This application claims the benefit of Korean Application No. 2000-22804, filed Apr. 28, 2000, in the Korean Industrial Property Office, the disclosure of which is incorporated herein by reference.

BACKGROUND OF THE INVENTION

1. Field of the Invention

The present invention relates to an error signal detection apparatus and method for an optical recording/reproducing system, and more particularly, to an error signal detection apparatus and method for an optical recording/reproducing system in which a tilt error signal between an objective lens and a recording medium can be detected using a main beam focused to record/reproduce an information signal on the recording medium.

2. Description of the Related Art

Optical pickups record an information signal on or reproduce an information signal from a recording medium, such as an optical disc seated on a turntable and rotating, while scanning the recording medium in the radial direction. However, if the rotating optical disc is tilted with respect to the optical axis, due to bending of the optical disc itself or error in loading the disc, degradation of a recording/reproduction signal can result.

When an optical pickup adopts a light source which emits a shorter wavelength of light, and an objective lens having a high numerical aperture (NA), for the purpose of increasing recording density, coma aberration caused by tilting of the optical disc increases, thereby further degrading the recording/reproduction signal. This is because optical aberration is proportional to $\lambda/(NA)^3$.

In an optical recording/reproducing system required for high-density recording and reproduction with a medium, such as a digital versatile disc (DVD) and/or future generation DVD (so-called high definition (HD)-DVD), there is a need for a tilt error signal detection apparatus capable of preventing degradation of the recording/reproduction signal by detecting the degree of tilting between the objective lens and the disc and correcting for the tilting of the disc.

On the other hand, as shown in FIG. 1, light reflected by a disc 10, after having been focused on the disc 10 for recording/reproduction, is diffracted into a 0th order diffracted beam and ±1st order diffracted beams by record marks such as pits (P) formed on the tracks of the disc 10. The reflected light passes through objective lens 7. Thus, a photodetector 9 receives the 0th order diffracted beam and ±1st order diffracted beams, which overlap each other in the radial direction. FIG. 1 illustrates light reflected and diffracted in the radial direction from a high-density disc having narrow tracks, e.g., a ROM type disc. This shows the case where spots formed on the photodetector 9 by the ±1st order diffracted beams are separated from each other, and each of the spots overlaps the spot formed by 0th order diffracted beam.

SUMMARY OF THE INVENTION

Accordingly, it is an object of the present invention to provide an error signal detection apparatus and method for an optical recording/reproducing system, which is less affected by detrack, and external noise due to high signal-to-noise ratio (S/N).

Additional objects and advantages of the invention will be set forth in part in the description which follows, and, in part, will be obvious from the description, or may be learned by practice of the invention.

According to an aspect of the present invention, there is provided an error signal detection method for an optical recording/reproducing system, the method comprising: (a) detecting light incident through an objective lens after having been reflected and diffracted from a recording medium, as eight light portions arranged in a 2×4 matrix, including four inner light portions, and four outer light portions around the corresponding inner light portions, wherein the row and column of the matrix are parallel to the tangential and radial direction of the recording medium, respectively; (b) calculating at least one first sum signal by summing a detection signal from at least one outer light portion located in a first diagonal direction, and a detection signal from at least one inner light portion located in a second diagonal direction; (c) calculating at least one second sum signal by summing a detection signal from at least one inner light portion located in the first diagonal direction, and a detection signal from at least one outer light portion located in the second diagonal direction; and (d) comparing the phases of the first and second sum signals and outputting at least one phase comparison signal, wherein a tilt error signal is detected from the phase comparison signal.

In step (b), a pair of first sum signals are obtained by summing a detection signal from one outer light portion located in the first diagonal direction and a detection signal from one inner light portion located in the second diagonal direction, and by summing a detection signal from the other outer light portion located in the first diagonal direction and a detection signal from the other inner light portion located in the second diagonal direction 1; in step (c), a pair of second sum signals are obtained by summing a detection signal from one outer light portion located in the second diagonal direction and a detection signal from one inner light portion located in the first diagonal direction, and by summing a detection signal from the other outer light portion located in the second diagonal direction and a detection signal from the other inner light portion located in the first diagonal direction; and in step (c), the phases of the pair of the first sum signals are compared with each other, and the phases of the pair of the second sum signals are compared with each other, to output a pair of phase comparison signals, and the pair of the phase comparison signals are summed.

Furthermore, in step (b), a first sum signal is obtained by summing detection signals from the pair of outer light portions located in the first diagonal direction and from the pair of inner light portions located in the second diagonal direction; in step (c), a second sum signal is obtained by summing detection signals from the pair of inner light portions located in the first diagonal direction and from the pair of outer light portions located in the second diagonal direction; and in step (d), the phases of the first and second sum signals are compared with each other to output a phase comparison signal.

According to another embodiment of the present invention, there is provided an error signal detection apparatus for an optical recording/reproducing system, comprising: a photodetector to receive light incident from an objective lens after having been reflected and diffracted from a recording medium; and a signal processor to detect an error signal by processing detection signals from the photodetector, wherein the photodetector includes four inner and four outer sections arranged in a 2×4 matrix, to independently receive and photoelectrically convert incident light, each pair of the inner and outer sections being arranged in the radial direction of the recording medium, wherein the row and column of the matrixes are parallel to the radial and tangential directions of the recording medium, respectively; and the signal processor compares the phase of the sum of detection signals from at least one outer section located in one diagonal direction and from at least one inner section located in the other diagonal direction, with the phase of the sum of detection signals from at least one outer section arranged in the other diagonal direction and from at least one inner section arranged in the one diagonal direction, to output at least one phase comparison signal, and the signal processor detects a tilt error signal from the phase comparison signal.

The signal processor comprises: a first phase comparator to receive a sum signal of detection signals from one outer section located in the first diagonal direction and from one inner section located in the second diagonal direction, and a sum signal of detection signals from one outer section located in the second diagonal direction in the same row as the one outer section in the first diagonal direction and from one inner section located in the first diagonal direction, comparing the phases of the two received sum signals, and outputting a phase comparison signal; a second phase comparator to receive a sum signal of detection signals from the other outer section located in the first diagonal direction and from the other inner section located in the second diagonal direction, and a sum signal of detection signals from one outer section located in the second diagonal direction in the same row as the other outer section in the first diagonal direction and from the other inner section located in the first diagonal direction, comparing the phases of the two received sum signals, and outputting a phase comparison signal; and an adder to sum the phase comparison signals from the first and second phase comparators.

The signal processor comprises a phase comparator to receive a first sum signal of detection signals from the outer sections located in the first diagonal direction and from the inner sections located in the second diagonal direction; to receive a second sum signal of detection signals from the outer sections in the second diagonal direction and from the inner sections located in the first diagonal direction; and to compare the phases of the first and second sum signals to output a phase comparison signal.

The error signal detection apparatus for an optical recording/reproducing system further comprises: a tracking error detector to detect a tracking error signal by comparing the phase of a sum signal of the detection signals from the inner and outer sections located in the first diagonal direction, with the phase of a sum signal of the detection signals from the inner and outer sections located in the second diagonal direction; and a differential part to subtract the tracking error signal output from the tracking error detector from the signal output from the signal processor, so that a detrack component is eliminated from the tilt error signal.

Assuming that tilt error signal levels detected at +1° and −1° radial tilts with respect to a reference level are v1 and v2, respectively, the tilt error signal detected in an on-track state satisfies that the maximum absolute value of (v1−v2)/(v1+v2) is 0.2 or less. Furthermore, assuming that tilt error signal levels detected at +1° and −1° radial tilts with respect to a reference level are v3 and v4, respectively, the tilt error signal detected satisfies the minimum absolute value of v3 or v4 is about 50% of a tracking error signal level detected in the off-stack by phase comparison.

BRIEF DESCRIPTION OF THE DRAWINGS

These and other objects and advantages of the present invention will become apparent and more readily appreciated from the following description of the preferred embodiments, taken in conjunction with the accompanying drawings of which.

DETAILED DESCRIPTION OF THE INVENTION

Figure 1:
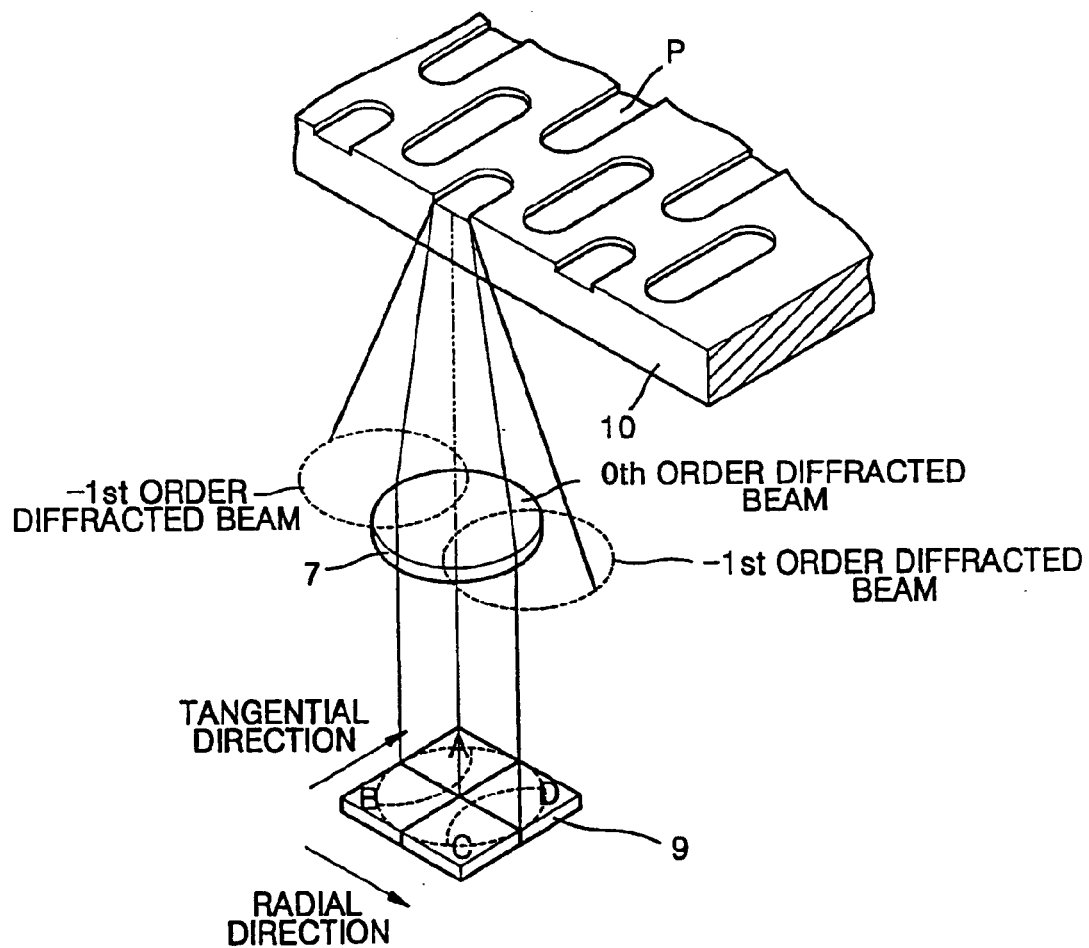
FIG. 1 illustrates light reflected and diffracted from a general ROM type high-density recording medium.

Reference will now be made in detail to the present preferred embodiments of the present invention, examples of which are illustrated in the accompanying drawings, wherein like reference numerals refer to like elements throughout.

The present application relates to an error signal detection apparatus for an optical recording/reproducing system, which is capable of accurately detecting a degree of tilting based on the reflection and diffraction of the light beam by the record marks of the disc 10 even when the objective lens is shifted or when an objective lens-to-disc distance is beyond On-focus positions.

Figure 2:
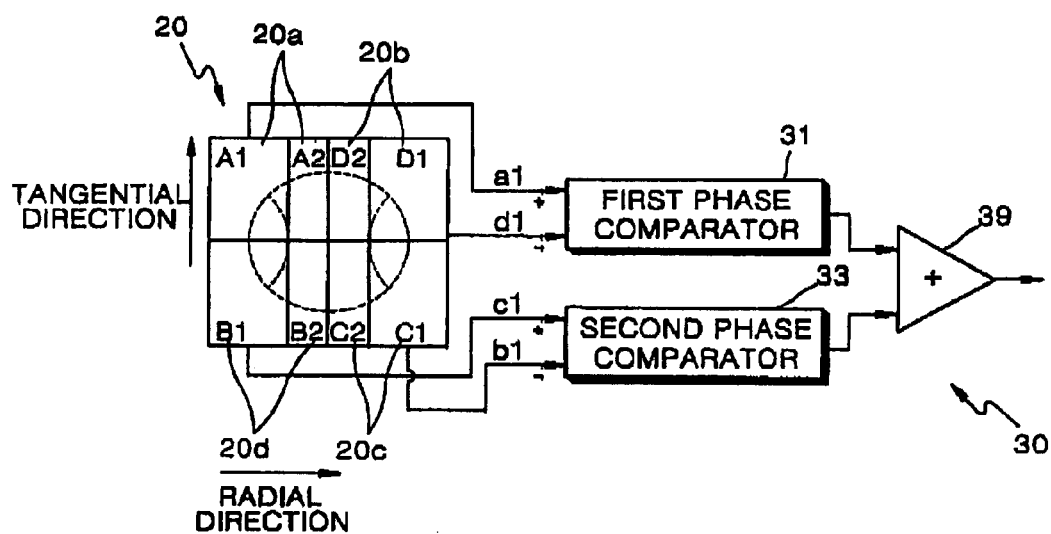
FIG. 2 illustrates an example of an error signal detection apparatus for an optical recording/reproducing system as set forth by the present applicant.

FIG. 2 illustrates an example of the error signal detection apparatus for an optical recording/reproducing system which has been filed by the present applicant, claiming priority from Korean Patent Application No. 2000-12051 (10 Mar. 2000), and assigned Japanese Patent Application No. 12-280634 (14 Sep. 2000), Taiwanese Patent Application No. 89119016 (15 Sep. 2000), U.S. patent application Ser. No. 09/663,839 (15 Sep. 2000), and Chinese Patent Application No. 00136638.6 (16 Sep. 2000). As shown in FIG. 2, the error signal detection apparatus includes a photodetector 20 to receive light reflected and diffracted from a recording medium such as the disc 10 of FIG. 1, and a signal processor 30 to detect an error signal by processing detection signals from the photodetector 20.

The photodetector 20 is composed of eight sections A1, A2, B1, B2, C1, C2, D1 and D2 arranged in a 2×4 matrix, which separately receive and perform photoelectric conversion on light incident from the recording medium. The boundary between the sections in the row direction is parallel to the radial direction of the recording medium, and the boundaries between the sections in the column direction are parallel to the tangential direction of tracks of the recording medium. The outer sections are assigned A1, B1, C1 and D1 and the inner sections are assigned A2, B2, C2 and D2 counterclockwise in order.

The signal processor 30 includes a first phase comparator 31 to compare the phases of detection signals a1 and d1 of the outer sections A1 and D1 in the first row, a second phase comparator 33 to compare the phases of the detection signals b1 and c1 of the outer sections B1 and C1 in the second row, and an adder 39 to sum phase comparison signals from the first and second phase comparators 31 and 33.

When a tracking servo is operated, the signal processor 30 having the above configuration outputs a tilt error signal. A relative tilting between the recording medium and the objective lens can be detected using the tilt error signal from the signal processor 30.

Figure 3:
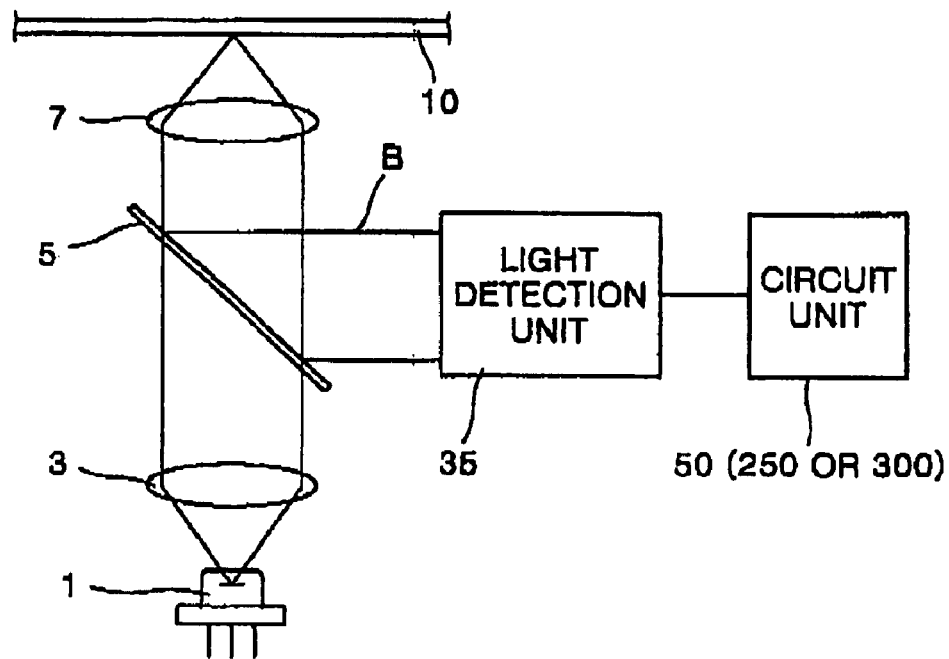
FIG. 3 illustrates an example of an optical pickup adopting a photodetector for use in an error signal detection apparatus for an optical recording/reproducing system according to the present invention.
Figure 4:
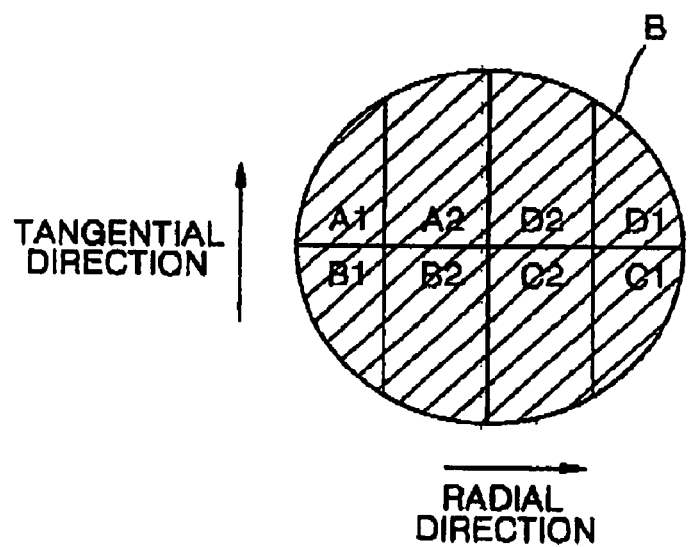
FIG. 4 illustrates eight light portions divided by the light detection unit of FIG. 3, after having been reflected and diffracted from the recording medium.

According to the present invention, referring to FIGS. 3 and 4, light B reflected and diffracted by a recording medium 10 passes an objective lens 7 and an optical path changing unit 5, is divided into eight light portions A1, A2, B1, B2, C1, C2, D1 and D2, and detected by a light detection unit 35. A signal processor 50, which will also be designated by reference numerals 250 or 300 below, detects tilt error signals from a signal output from the light detection unit 35. Light is emitted by a light source 1 and then passes through a lens 3.

FIG. 4 illustrates eight light portions A1, A2, B1, B2, C1, C2, D1 and D2 divided from light B by the light detection unit 35, after having been reflected and diffracted by the recording medium 10. According to the present invention, light B incident from the recording medium 10 is divided into a 2×4 matrix, including the four outer light portions A1, B1, C1 and D1 and the inner light portions A2, B2, C2 and D2, and independently detected by the light detection unit 35. Here, the horizontal boundary and vertical boundaries for the eight light portions A1, A2, B1, B2, C1, C2, D1 and D2 are parallel to the radial direction of the recording medium 10 and the tangential direction of tracks of the recording medium 10, respectively.

Figure 5:
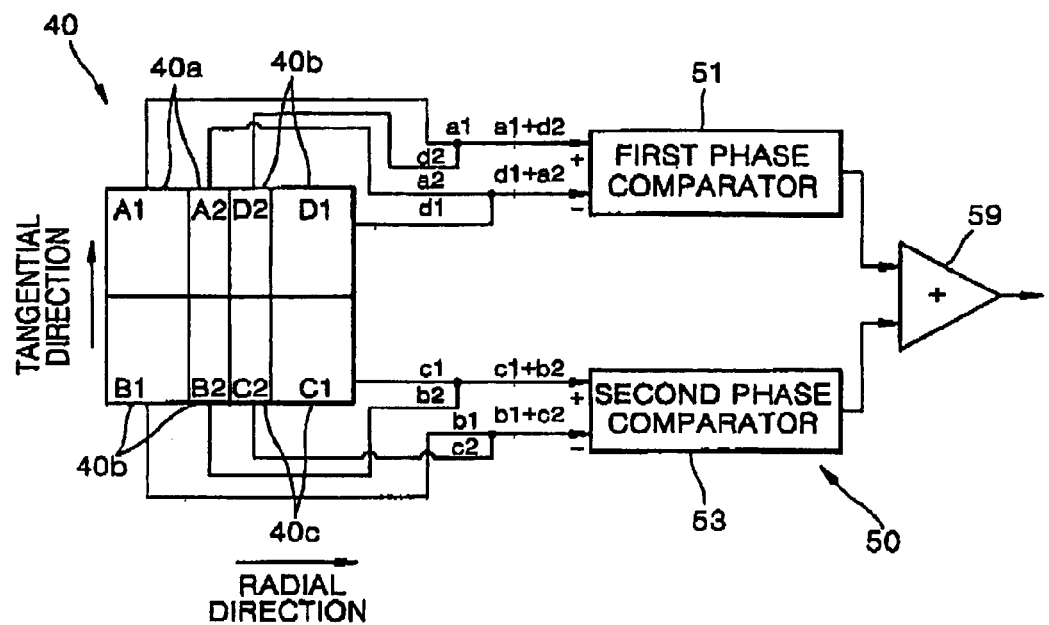
FIGS. 5 through 7 illustrate various alternative embodiments of an error signal detection apparatus for an optical recording/reproducing system according to the present invention.
Figure 20:
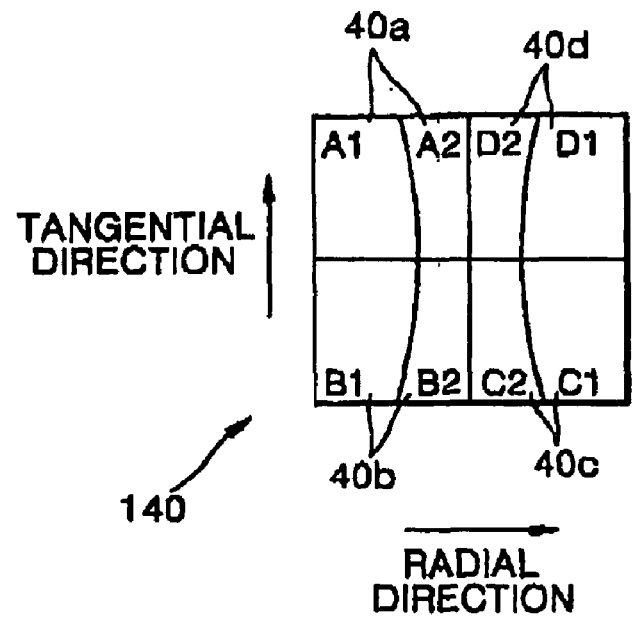
FIGS. 20 and 21 are plan views of another embodiments of the photodetector adopted in an error signal detection apparatus according to the present invention.
Figure 21:
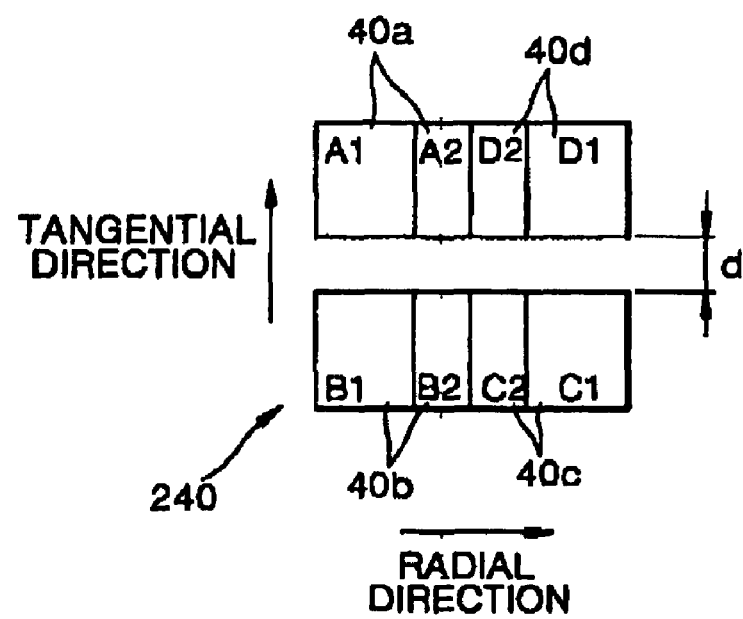

As the light detection unit 35 to independently detect light B as the eight light portions A1, A2, B1, B2, C1, C2, D1 and D2, an 8-section photodetector according to the present invention, which is denoted by reference numeral 40 in FIG. 5, reference numeral 140 in FIG. 20, and reference numeral 240 in FIG. 21, can be adopted.

Alternatively, the light detection unit 35 can be constructed of a light dividing element (not shown), and a photodetector (not shown) arranged corresponding to the light dividing element. The light dividing element may include a diffracting element, such as a hologram optical element (HOE), having 8 diffracting portions arranged in a 2×4 matrix. The diffracting element with the 8 diffracting portions splits incident light into 8 light portions by diffracting and transmitting incident light into +1st or −1st order diffracted beams. Here, the direction of a diffracting pattern and the pitch width of the eight diffracting portions are designed in association with the configuration of the photodetector.

The signal processor 50, 250 or 300 sums the detection signal from at least one outer light portion in one diagonal direction, and the detection signal from at least one inner light portion in the other diagonal direction, detects at least a pair of sum signals, compares the phases of the sum signals, and detects a tilt error signal from the phase comparison signal. This will be described in detail with reference to FIGS. 5 through 7, and FIGS. 12 through 15.

Embodiments of an error signal detection apparatus for an optical recording/reproducing system according to the present invention will be described, in which the photodetector 40, 140 or 240 is adopted as the light detection unit 35. Referring to FIG. 5, an embodiment of the error signal detection apparatus according to the present invention includes a photodetector 40 to receive light reflected and diffracted from a recording medium, such as the disc 10 of FIG. 1, and a signal processor 50 to process the detection signals from the photodetector 40 and to detect an error signal. The photodetector 40 receives light reflected from the recording medium and outputs electrical detection signals which will be used in detecting a tilt error signal caused by a relative tilt of the objective lens 7 with respect to the recording medium, a tracking error signal and a reproduction signal from the recording medium. In other words, the photodetector 40 is a photodetector which is adopted in the optical pickup, as shown in FIG. 3, for use in detecting an information signal.

The photodetector 40 includes first through fourth light receiving portions 40a (A1/A2), 40b (B1/B2), 40c (C1/C2) and 40d (D1/D2) in a 2×2 matrix, which are arranged counterclockwise in order. As shown in FIG. 5, the first and fourth light receiving portions are in the first row, and the second and third light receiving portions are in the second row. Here, the horizontal and vertical boundaries of the four light receiving portions 40a, 40b, 40c and 40d are parallel to the radial and tangential directions of the recording medium, respectively. Each of the light receiving portions 40a, 40b, 40c and 40d are also divided into two sections in the radial direction of the recording medium, so that four inner sections A2, B2, C2 and D2, and four outer sections A1, B1, C1 and D1 result. In the embodiment shown in FIG. 5, the respective inner and outer sections A2 and A1, B2 and B1, C2 and C1, and D2 and D1 of each of the light receiving portions 40a, 40b, 40c and 40d have constant widths.

In other words, the photodetector 40 includes 8 sections in a 2×4 matrix, including four outer sections A1, B1, C1 and D1 arranged counterclockwise in order, and four inner sections A2, B2, C2 and D2 arranged counterclockwise in order. Each of the 8 sections separately performs photoelectric conversion on incident light.

In the error signal detection apparatuses according to the embodiments of the present invention, when light is reflected from a ROM type recording medium including a HD-DVD ROM, such as the disc 10 of FIG. 1, and diffracted by record pits (record marks for a RAM type recording medium, such as HD-DVD RAM) of the recording medium into 0th order and ±1st order diffracted beams in the radial direction of the recording medium, the photodetectors 40, 140 or 240 are designed such that spots formed on each of the photodetectors 40, 140 or 240 by the ±1st order diffracted beams are separated from each other, and each of the spots partially overlap the spot formed by the 0th order diffracted beam.

In other words, the inner sections A2, B2, C2 and D2 receive only a portion of the overlapping portions between each of the spots by the ±1st order diffracted beams and the spot by the 0th order diffracted beam, or do not receive the overlapping portions at all. The inner sections A2, B2, C2 and D2 are long in the tangential direction and narrow in the radial direction.

The total width of the inner sections A2, B2, C2 and D2 in the radial direction is appropriately determined with the range of 10 to 80% of the diameter of the 0th order diffracted beam in consideration of the track pitch and pit length of the recording medium, the numerical aperture (NA) of the objective lens of the optical pickup used, and the wavelength of light emitted from a light source.

Detection signals a2, b2, c2 and d2 from the inner sections A2, B2, C2 and D2 of the photodetector 40 having the configuration described above exclusively include the characteristics of the 0th order diffracted beam, while detection signals a1, b1, c1 and d1 from the outer sections A1, B1, C1 and D1 include the characteristics of the overlapping portions between each of the ±1st order diffracted beams and the 0th order diffracted beam.

The detection signals from the eight sections of the photodetector 40 have phase characteristics as follows. The detection signals a1 and c1 of the outer sections A1 and C1 arranged in a first diagonal direction have almost the same phase characteristics, and the detection signals b1 and d1 of the outer sections B1 and D1 arranged in a second diagonal direction have almost the same phase characteristics. When there is a relative tilting between the objective lens and the recording medium, the detection signals a1 and b1 of the outer sections A1 and B1 arranged in the tangential direction of the recording medium have the opposite phase characteristics, and the detection signals c1 and d1 of the outer sections C1 and D1 have the opposite phase characteristics.

In a similar way, the detection signals a2 and c2 of the inner sections A2 and C2 arranged in the first diagonal direction have almost the same phase characteristics, and the detection signals b2 and d2 of the inner sections B2 and D2 arranged in the second diagonal direction have almost the same phase characteristics. When there is a relative tilting between the objective lens and the recording medium, the detection signals a2 and b2 of the inner sections A2 and B2 arranged in the tangential direction of the recording medium have the opposite phase characteristics, and the detection signals c2 and d2 of the inner sections C2 and D2 have the opposite phase characteristics.

In addition, when the phase of the detection signal a1 leads the phase of the detection signal b1 or d1, the phase of the detection signal a1 lags the phase of the detection signal b2 or d2.

According to the present invention, the signal processor 50 detects a tilt error signal using at least one phase comparison signal obtained by comparing the phase of the sum signal of the detection signal of at least one outer section in one diagonal direction and the detection signal of at least one inner section in the other diagonal direction, with the phase of the sum signal of the detection signal of at least one inner section in the one diagonal direction and the detection signal of at least one outer section in the other diagonal direction.

For example, as shown in FIG. 5, the signal processor 50 has a first phase comparator 51 to receive the detection signals of the first and fourth light receiving portions 40a and 40d in the first row and to output a phase comparison signal, and a second phase comparator 53 to receive the detection signals of the second and third light receiving portions 40b and 40c in the second row, and an adder 59 to sum the two phase comparison signals from the first and second phase comparators 51 and 53.

In particular, the sum of the detection signals a1 and d2, which are from the outer section A1 of the first light receiving portion 40a arranged in the first diagonal direction, and the inner section D2 of the fourth light receiving portion 40d arranged in the second diagonal direction, respectively, is input to a positive input end of the first phase comparator. The sum of the detection signals a2 and d1, which are from the inner section A2 of the first light receiving portion 40a, and the outer section D1 of the fourth light receiving portion 40d, respectively, is input to a negative input end of the first phase comparator 51.

The sum of the detection signals b2 and c1, which are from the inner section B2 of the second light receiving portion 40b in the second diagonal direction, and the outer section C1 of the third light receiving portion 40c in the first diagonal direction, respectively, is input to the positive input end of the second phase comparator 53. The sum of the detection signals b1 and c2, which are from the outer section B1 of the second light receiving portion 40b and the inner section C2 of the third light receiving portion 40c, respectively, are input to the negative input end of the second phase comparator 53.

Alternatively, the signal processor 50 may further comprise a plurality of gain controllers 54 to amplify the detection signals a2, b2, c2 and d2 of the inner sections A2, B2, C2 and D2 by a predetermined gain factor k, respectively. Each of the detection signals a2, b2, c2 and d2 of the inner sections A2, B2, C2 and D2 is amplified and then summed with the detection signals from the corresponding outer sections. Accordingly, although the light receiving portions are divided into inner and outer sections such that the amount of light received by the inner sections is less than the amount of light received by the outer sections, the amplitudes of the detection signals of the inner sections can be adjusted to be almost equal to those of the detection signals of the outer sections. As a result, a noise component can be effectively eliminated, so that a tilt error signal can be accurately detected with a high S/N.

Figure 7:
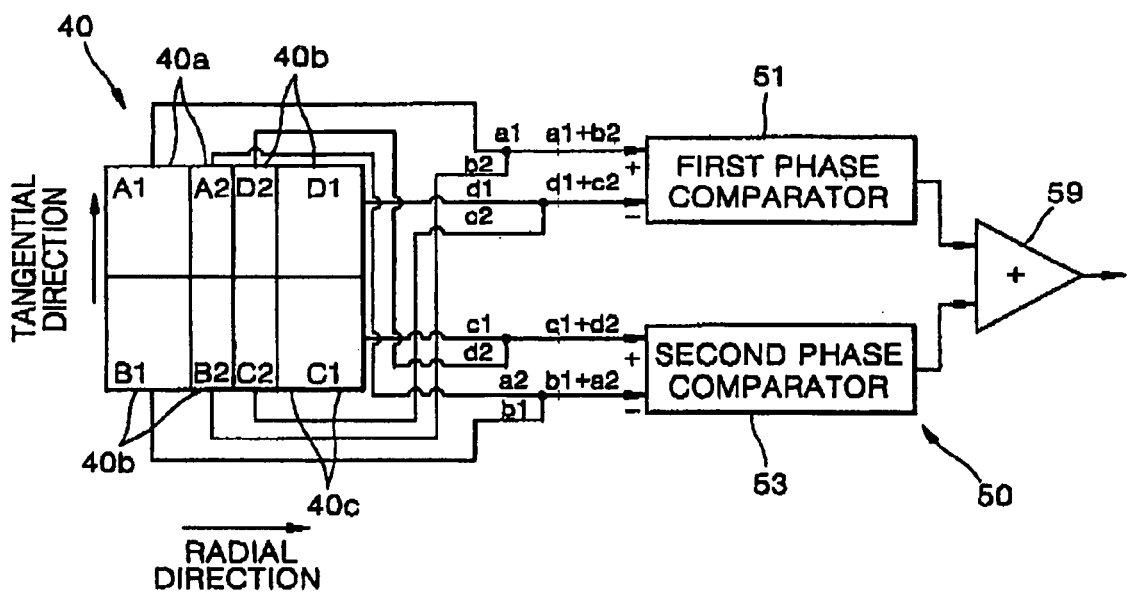

The phase characteristics of the detection signals of the inner sections arranged in a diagonal direction are almost the same, and the phase characteristics of the detection signals of the outer sections arranged in a diagonal direction are almost the same. Based on these phase characteristics, the signal processor 50 of FIG. 5 can be varied as shown in FIG. 7. In particular, the detection signal b2 of the inner section B2 of the second light receiving portion 40b, instead of the detection signal d2 of the inner section D2 of the fourth light receiving portion 40d, is provided to the positive input end of the first phase comparator 51. The detection signal c2 of the inner section C2 of the third light receiving portion 40c, instead of the detection signal a2 of the inner section A2 of the first light receiving portion 40a, is provided to the negative input end of the first phase comparator 51.

In a similar way, the detection signal d2 of the inner section D2 of the fourth light receiving portion 40d, instead of the detection signal b2 of the inner section B2 of the second light receiving portion 40b, is provided to the positive input end of the second phase comparator 53. The detection signal a2 of the inner section A2 of the first light receiving portion 40a, instead of the detection signal c2 of the inner section C2 of the third light receiving portion 40c, is provided to the negative input end of the second phase comparator 53.

Figure 6:
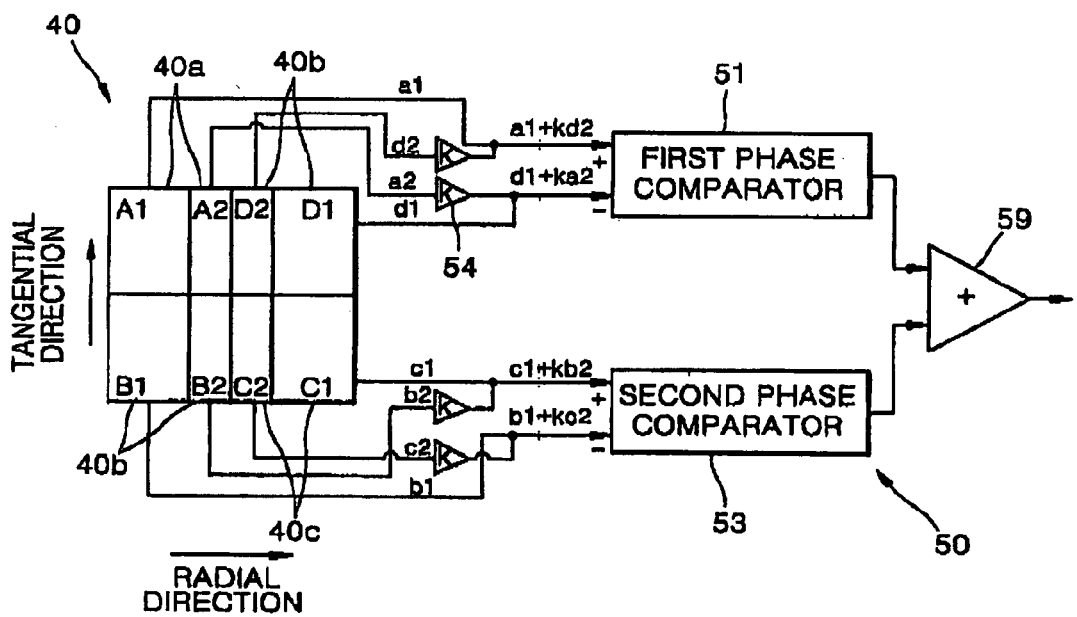

Although the signal processor 50 is constructed as shown in FIG. 7, the phase comparison signals from the first and second phase comparators 51 and 53 are substantially similar to those from the first and second phase comparators of FIG. 5. It will be appreciated that the signal processor 50 of FIG. 7 can further includes gain controllers 54, as shown in FIG. 6.

Detection of a tilt error signal by the error signal detection apparatuses illustrated in FIGS. 3 through 7 will be described. Referring to FIGS. 3 through 7, when light B reflected and diffracted from the recording medium is incident on the light detection unit 35, preferably, on the photodetector 40, through the objective lens 7 and the optical path changing means 5, incident light B is divided into eight light portions A1, A2, B1, B2, C1, C2, D1 and D2 by the eight sections A1, A2, B1, B2, C1, C2, D1 and D2 of the photodetector 40 in a 2×4 matrix. Each of the eight sections of the photodetector 40 independently detects the corresponding light portion.

Among the detection signals of the photodetector 40, the detection signal a1 of the outer section A1 arranged in a first diagonal direction and the detection signal d2 or b2 of the inner section D2 or B2 arranged in a second diagonal direction are summed, and the detection signal d1 of the outer section D1 in the second diagonal direction and the detection signal a2 or c2 of the inner section A1 or C2 in the first diagonal direction are also summed. The two sum signals are input to the first phase comparator 51.

In a similar way, among the detection signals of the photodetector 40, the detection signal c1 of the outer section C1 arranged in the first diagonal direction and the detection signal b2 or d2 of the inner section B2 or D2 arranged in the second diagonal direction are summed, and the detection signal b1 of the outer section B1 arranged in the second diagonal direction, and the detection signal c2 or a2 of the inner section C2 or A2 arranged in the first diagonal direction are summed. The two sum signals are input to the second phase comparator 53. The first and second phase comparators 51 and 53 compare the phases of the input sum signals. The adder 59 sums the phase comparison signals from the first and second phase comparators 51 and 53 and outputs a tilt error signal.

In the embodiments of the error signal detection apparatuses described with reference to FIGS. 3 through 7, for example, the detection signal a1 whose phase leads the phase of the detection signal d1 and the detection signal d2 whose phase lags the phase of the detection signal a2 are summed, and the sum signal is input to the first phase comparator 51. Because the detection signals a1 and d2 which have the opposite phase characteristics are summed, noise components contained therein are eliminated. Thus, as shown in FIGS. 8A, 8B, 9A and 9B, a tilt error signal with reduced noise component can be detected, compared to the error signal detection apparatus shown in FIG. 2. In particular, if the signal processor 50 includes the gain controllers 54, as shown in FIG. 6, the detection signals of the inner sections are amplified by a predetermined gain factor, and then summed with the detection signals of the outer sections, which have the opposite phase characteristics to those of the detection signals of the inner sections. In other words, the amplitudes of the noise components from the detection signals of the inner and outer sections are similar to each other, so that the noise components can be effectively eliminated. For reference, in detecting the output signals illustrated in FIGS. 8A, 8B, 9A and 9B, the wavelength of light emitted from a light source adopted was 400 nm, the NA of the objective lens used was 0.65, and the track pitch and the minimum pit length of the recording medium were 0.37 $\mu$m and 0.25 $\mu$m, respectively.

Figure 8A:
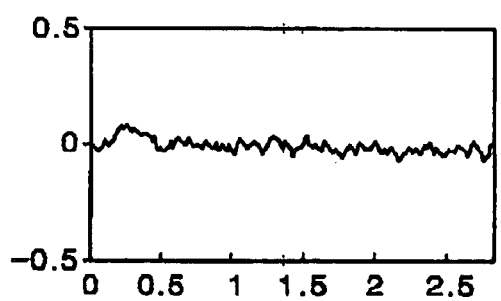
FIGS. 8A and 8B are graphs showing the output signals of the error signal detection apparatus of FIG. 2.
Figure 8B:
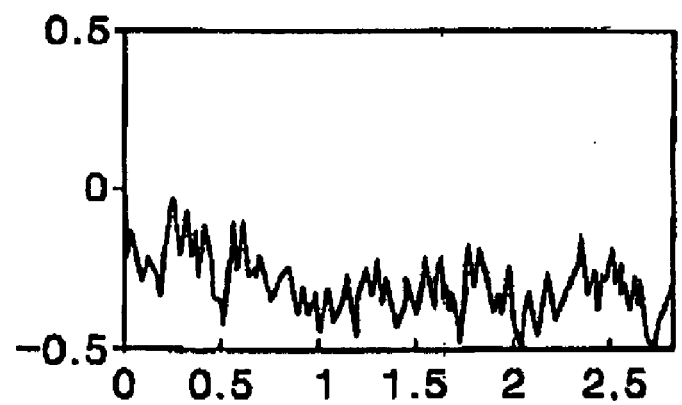
Figure 9A:
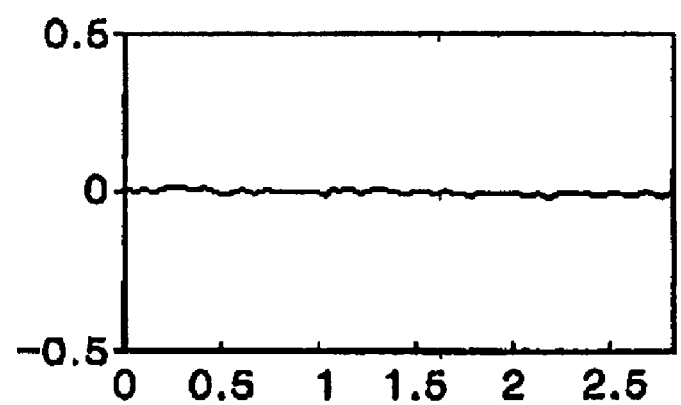
FIGS. 9A and 9B are graphs showing the output signals of the error signal detection apparatus of FIG. 5.
Figure 9B:
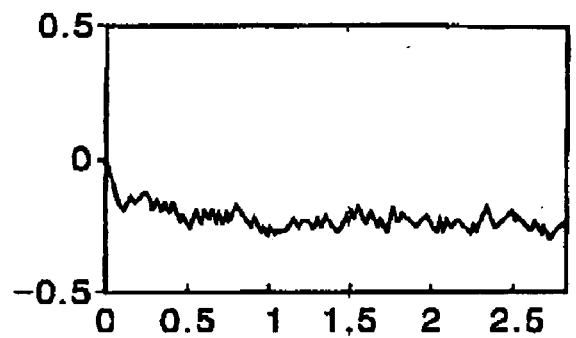

FIGS. 8A and 8B illustrate the output signals from the error signal detection apparatus shown in FIG. 2 when no relative tilt occurs between the objective lens and the recording medium, and when a relative tilt between the objective lens and the recording medium occurs, respectively. FIGS. 9A and 9B illustrate the output signals from the error signal detection apparatus shown in FIG. 5 when no relative tilting occurs, and when a relative tilt occurs between the objective lens and the recording medium, respectively.

Comparing the output signals shown in FIGS. 8A and 9A, from the two error signal detection apparatuses when there occurs no tilt, it is apparent that the signal shown in FIG. 8A includes a considerable amount of noise. In contrast, the output signal from the present error signal detection signal contains almost no noise component, as shown in FIG. 9A. In a similar way, when a tilt occurs, the output signal from the error signal detection apparatus of FIG. 2 contains a considerable amount of noise, as shown in FIG. 8B, whereas the output signal from the present error signal detection apparatus contains almost no noise component, as shown in FIG. 9B.

Figure 10A:
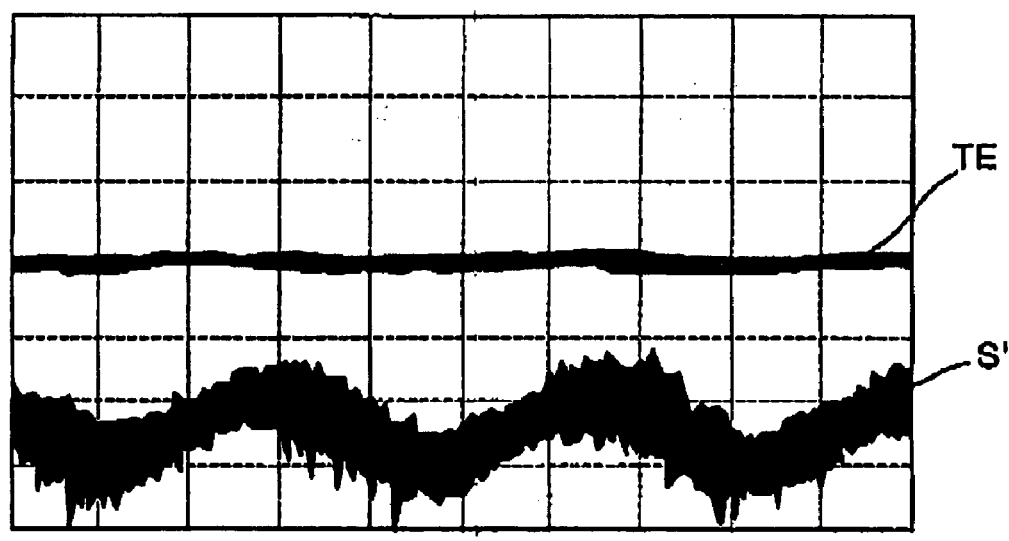
FIGS. 10A and 10B are graphs showing the output signals of the error signal detection apparatuses of FIGS. 2 and 5, respectively, when a tracking error signal level is constant.
Figure 10B:
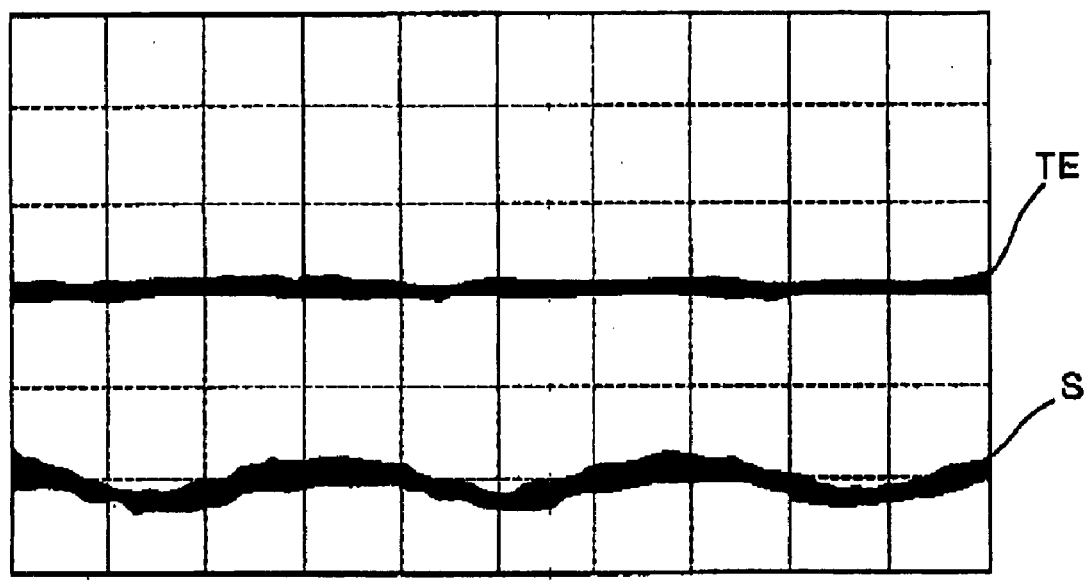

FIGS. 10A and 10B comparatively show the tilt error signals S' and S from the error signal detection apparatus of FIG. 2 and the present error signal detection apparatus of FIG. 5, respectively, when a tracking servo is operated such that the light spots follow the center of a target track and the tracking error signal TE level is kept constant. In this situation, the output signal S' from the error signal detection apparatus of FIG. 2, contains a considerable amount of noise, as shown in FIG. 10A, whereas the noise component in the output signal S from the inventive error signal detection apparatus sharply decreases, as shown in FIG. 10B.

As previously described with reference to the graphs, the embodiment of the error signal detection apparatus according to the present invention can improve the noise characteristics of a tilt error signal, so that a tilt error signal with a high S/N can be detected, compared with the error signal detection apparatus of FIG. 2. The tilt error signal is almost not affected by external noise component.

Figure 11:
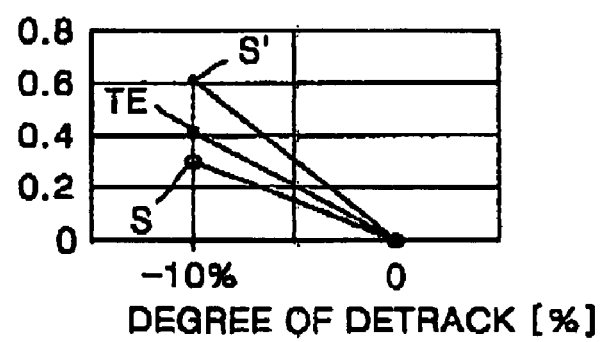
FIG. 11 is a graph comparatively showing the effect of detrack on the output signals of the error signal detection apparatuses of FIGS. 2 and 5.

In addition, as shown in FIG. 11, the tilt error signal S detected by the inventive error signal detection apparatus 5 is less affected by detrack, compared with the tilt error signal S' output from the error signal detection apparatus shown in FIG. 2. According to the preferred embodiment of the error signal detection apparatus of the present invention, although the pit depths of the recording medium are different, the tilt error signal having reduced offset can be detected with respect to the radial shifting of the objective lens 7.

In particular, FIG. 11 illustrates the effect of detrack on the tilt error signal S by the present error signal detection apparatus and the tilt error signal S' by the error signal detection apparatus of FIG. 2, when no tilt occurs. In FIG. 11, the tracking error signal TE level is also illustrated. As shown in FIG. 11, when no detrack occurs, the tracking error signal TE level and the tilt error signal levels S and S' are equal to zero. When a light spot focused on the recording medium deviates from the center of a target track by about 10% of the track pitch, i.e., when the degree of detrack is about −10%, the tilt error signal S' marks a relatively high level due to the detrack. The tilt error signal S is also affected by the detracking, but far less than the tilt error signal tilt error signal S'. The tilt error signal S also has a low level than the tracking error signal TE.

As previously described, the embodiment of the error signal detection apparatus for an optical recording/reproducing system according to the present invention can effectively detect the tilt error signal with a high S/N and is less affected by detrack and noise originating from the outside. The embodiment of the error signal detection apparatus according to the present invention utilizes all the detection signals of the eight sections of the photodetector 40, and adopts two phase comparators 51 and 53, so that the tilt error signal detected by the apparatus has a high gain level.

Figure 12:
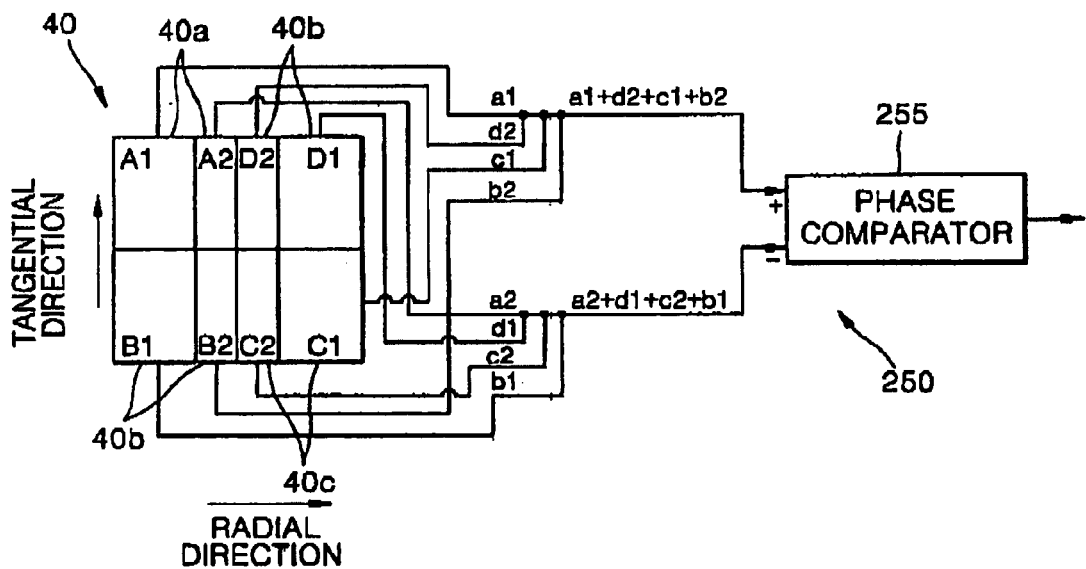
FIGS. 12 through 14 illustrate various alternative embodiments of the error signal detection apparatus according to the present invention.

FIG. 12 illustrates another embodiment of the error signal detection apparatus for an optical recording/reproducing system according to the present invention. The error signal detection apparatus of FIG. 12 is characterized in that the signal processor 250 includes just one phase comparator 255, which receives the detection signals of the photodetector 40 and outputs a phase comparison signal. The same reference numerals as those used in FIG. 5 are used to denote the same elements, and thus descriptions thereof will not be provided here.

The sum of the detection signals a1 and c1 of the outer sections A1 and C1 arranged in a first diagonal direction, and the detection signals b2 and d2 of the inner sections B2 and D2 arranged in a second diagonal direction is provided to the positive input end of the phase comparator 255. The sum of the detection signals a2 and c2 of the inner sections A2 and C2 arranged in the first diagonal direction, and the detection signals b1 and d1 of the outer sections B1 and D1 arranged in the second diagonal direction are provided to the negative input end of the phase comparator 255.

When the signal processor 250 adopts only one phase comparator 255 as in the present embodiment, the gain decreases slightly compared to the signal processor 50, which includes two phase comparators 51 and 53, as show in FIG. 5. The signal processor 250 is advantageous in terms of its simple configuration.

Like the error signal detection apparatus shown in FIG. 5, as the detection signals of the outer sections arranged in one diagonal direction and the detection signals of the inner sections arranged in the other diagonal direction are summed, noise components are eliminated because the detection signals of the diagonally opposite inner and outer sections have the opposite phase characteristics. As a result, a tilt error signal having a high S/N can be detected by the error signal detection apparatus of FIG. 12.

Figure 13:
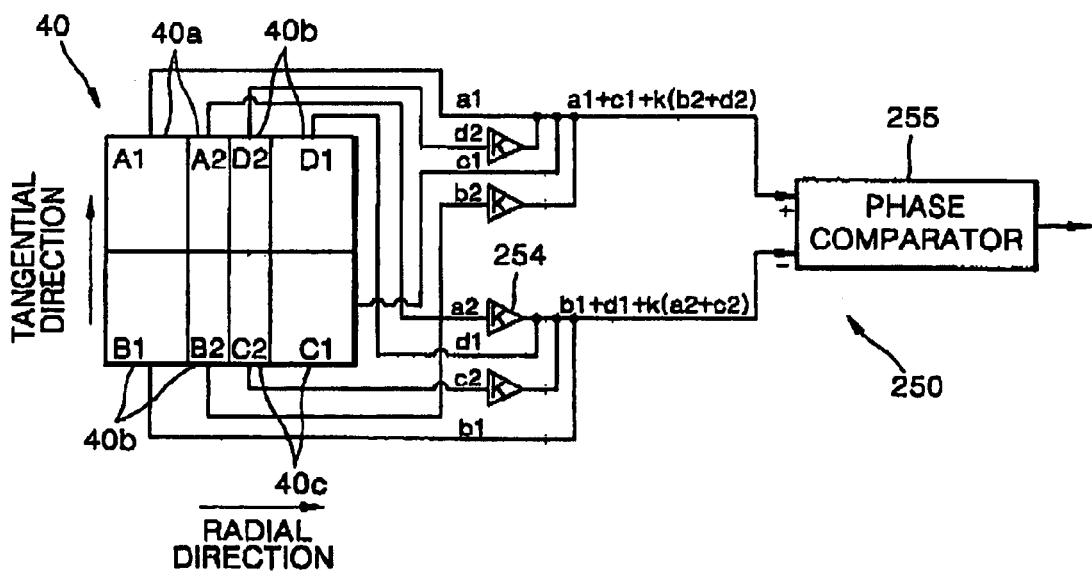

As in FIG. 6, the signal processor 250 may further include a plurality of gain controllers 254 to amplify each of the detection signals a2, b2, c2 and d2 of the inner sections A2, B2, C2 and D2 by a predetermined gain factor k, such that the detection signals a2, b2, c2 and d2 of the inner sections A2, B2, C2 and D2 are amplified and then summed with the detection signals a1, b1, c1 and d2 of the outer sections A1, B1, C1 and D1, as shown in FIG. 13, In this way, a tilt error signal with a high S/N can be detected.

On the other hand, when the signal processor 250 includes only one phase comparator 255, as shown in FIG. 12, the error detection signal output from the signal processor 250 can be offset if the pit depths vary for each recording medium and the objective lens of the optical pickup used is shifted in the radial direction.

Figure 14:
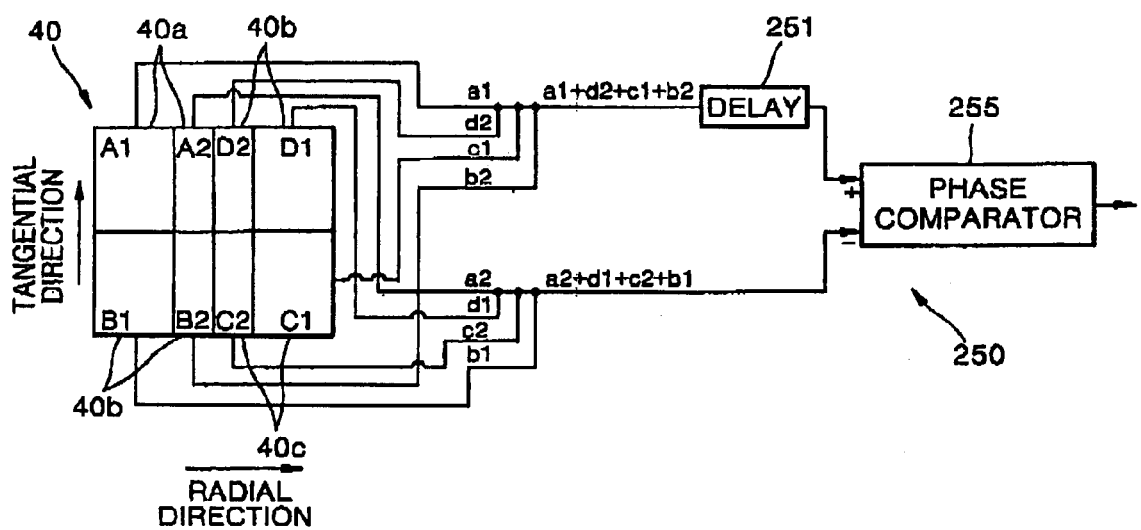

To enable the error signal detection apparatus to output a tilt error signal with suppressed offset even when there are variations in pit depths for each recording medium, it is preferable that the signal processor 250 further includes a delay 251 to delay the sum of the detection signals a1, b2, c1 and d2 to be input to the positive input end of the phase comparator 255. It will be appreciated that the signal processor 250 of FIG. 13 also includes a delay, as shown in FIG. 14.

In the embodiment of the error signal detection apparatus described with reference to FIG. 14, a pair of sum signals (a1+b2+c1+d2) and (a2+b1+c2+d1), or (a1+c1+k(b2+d2)) and (b1+d1+k(a2+c2)) are calculated, and one of the pairs of the sum signals are delayed by the delay 251, and the phases of the delayed signal and the other signal are compared by the phase comparator 255. As a result, even when the pit depths for each recording medium vary and the objective lens 7 is shifted in the radial direction, a tilt error signal can be detected without concern about being offset.

Figure 15:
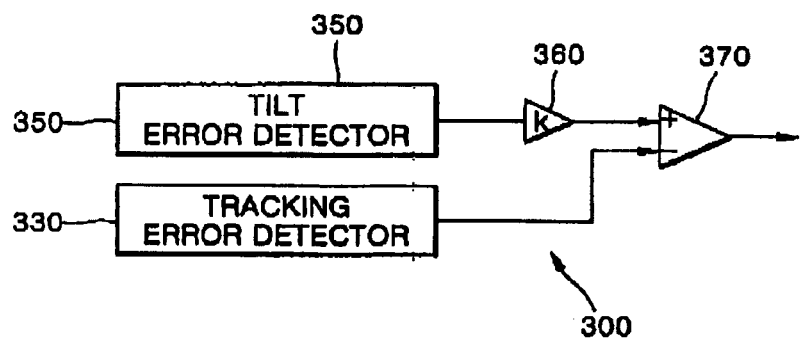
FIG. 15 illustrates another embodiment of the error signal detection apparatus according to the present invention.

FIG. 15 illustrates another embodiment of the error signal detection apparatus for an optical recording/reproducing system according to the present invention. The error signal detection apparatus of FIG. 15 is characterized in that the signal processor 300 is constructed such that the effect of detrack can be eliminated in detecting a tilt error signal from the detection signals of the photodetector 40. The same reference numerals as those used in FIG. 5 are used to denote the same elements, and thus descriptions thereof will not be provided here.

In the present embodiment illustrated in FIG. 15, the signal processor 300 includes a tilt error signal detector 350 to detect a signal containing a tilt error component, a tracking error detector 330 to detect a tracking error signal, and a differential part 370 to subtract the tracking error signal output from the tracking error detector 330 from the signal output from the tilt error detector 350. In particular, the tilt error detector 350 can be constructed to have any configuration of the signal processors 50 and 250 shown in FIGS. 5 through 7, and FIGS. 12 through 14. When a detrack occurs, as described with reference to FIG. 11, the tilt error signal output from the tilt error detector 350 includes a small detrack component.

The tracking error detector 330 includes one phase comparator (not shown), such that a tracking error signal is detected by phase differential detection, i.e., by comparing the phases of input signals. In particular, the tracking error detector 330 detects a tracking error signal by comparing the phase of the sum of the detection signals a1, a2, c1 and c2 of the first and third light receiving portions 40a and 40c arranged in one diagonal direction with the phase of the sum of the detection signals b1, b2, d1 and d2 of the second and fourth light receiving portions 40b and 40d arranged in the other diagonal direction. The tracking error detector 330 may be constructed such that a tracking error signal can be appropriately detected in another way according to the type of recording medium used.

The signal processor 300 of FIG. 15 may further include a gain controller 360, for example between the output end of the tilt error detector 350 and one input end of the differential part 370, to amplify the signal output from the tilt error detector 350 by a predetermined gain factor k and to output the product. The amount of detrack component is not equal for the signal from the tilt error detector 350 and for the signal from the tracking error detector 330, as described with reference to FIG. 11. Accordingly, the tilt error signal output from the tilt error detector 350 is corrected such that the differential part 370 receives the tilt error and tracking error signals which contain the same amount of detrack component.

As the signal of the tracking error detector 330 is subtracted from the signal of the tilt error detector 350 by the differential part 370, the detrack component is eliminated. As a result, just the signal of the tilt error component is output from the differential part 370, so that the error signal detection apparatus of FIG. 15 can more accurately detect a tilt error signal.

The elimination of the detracking component in detecting a tilt error signal by the signal processor 200 shown in FIG. 15 will be described below. In particular, referring to FIGS. 16A and 16B, there is a period of time during which the tilt error signal from the tilt error detector 350 and the tracking error signal from the tracking error detector 330 transform linearly. The linear transformation domain for each of the tilt error signal and the tracking error signal corresponds to at least about ±30% of the track pitch.

Figure 16A:
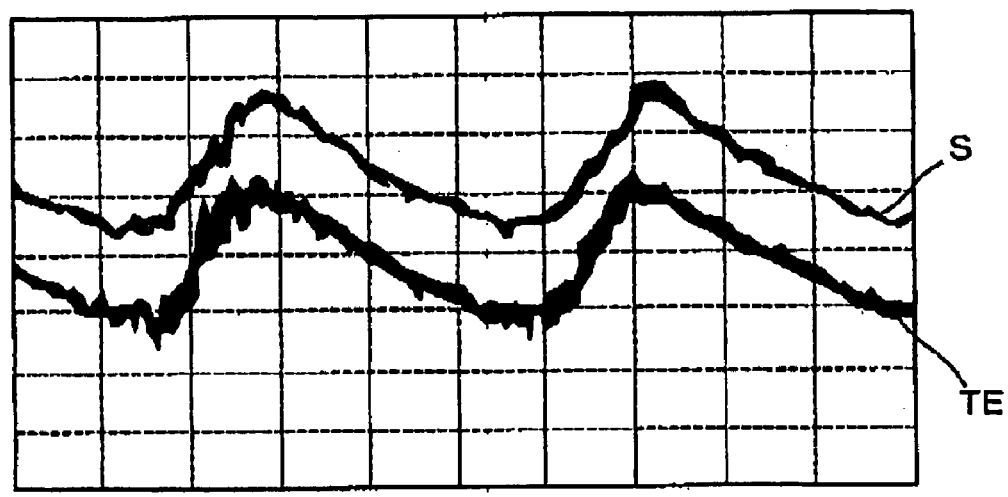
FIGS. 16A and 16B are graphs showing tilt error signals output from the tilt error detector of FIG. 15 and tracking error signals output from the tracking error detector of FIG. 15 in the off-track state.
Figure 16B:

FIGS. 16A and 16B illustrate a tilt error signal S and a tracking error signal TE on off-track positions when there is no radial tilt and there is a radial tilt, respectively. When there is no radial tilt, as shown in FIG. 16A, the tilt error signal S and the tracking error signal TE have almost the same phase characteristics, and the peak values of the tilt error signal S and the tracking error signal TE are coincided with each other. In contrast, when there is a radial tilt, as shown in FIG. 16B, a difference in level between the tilt error signal S and the tracking error signal TE becomes greater compared with the case of FIG. 16A. Also, the peak values of the tilt error signal S and the tracking error signal TE are at odd angles from each other. There is also a period of time during which the tilt error signal S and the tracking error signal TE transform almost linearly. Thus, the detrack component can be eliminated by subtracting the tracking error signal TE from the tilt error signal S during the linear transformation period, thereby detecting just the tilt error signal regardless of occurrence of detrack.

As previously described, the preferred embodiments of the error signal detection apparatus according to the present invention, which were described with reference to FIGS. 5 through 7, and FIGS. 12 through 15, are appropriate for detecting a tilt error signal when a light spot moves on the center of a track by normal tracking servo operation.

As can be interred from FIG. 16A, when there is no radial tilt, the tilt error signal detected by the inventive error signal detection apparatus has similar properties to those of the tracking error signal obtained by phase comparison, i.e., a phase differential method. Accordingly, it is apparent that the tilt error signal can be used as a detrack signal indicating the degree of deviation of a light spot from the center of a track. A tilt error signal contains less noise component than a tracking error signal, and varies very little, compared to the tracking error signal, even when the objective lens is shifted. For these reasons, use of the tilt error signal as a detrack signal is advantageous.

Figure 17A:
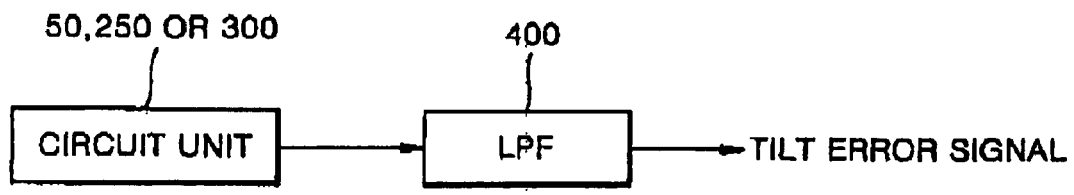
FIGS. 17A and 17B illustrate alternative embodiments of the signal processor of the error signal detection apparatus according to the present invention.
Figure 17B:
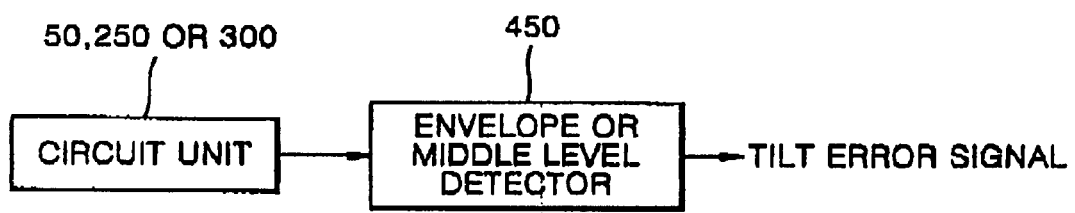

On the other hand, for the embodiments of the error signal detection apparatus according to the present invention, which were described with reference to FIGS. 5 through 7, and FIGS. 12 through 15, each of the signal processors 50, 250 and 300 may further include a low-pass filter (LPF) 400 at the output end thereof, as shown in FIG. 17A, or an envelope or middle level detector 450 to detect an envelope or variations of the middle level of a signal, as shown in FIG. 17B.

In particular, as shown in FIG. 17A, when the signal processor 50, 250 or 300 further includes the LPF 400, the tracking error signal, which is a relatively high-frequency component, is filtered by the LPF 400. Accordingly, the degree of relative tilting between the objective lens and the recording medium can be accurately detected irrespective of the tracking servo operation. At this time, the cutoff frequency of the LPF 400 can vary according to the uses of the tilt error signal. For example, when a tilt error signal is used for compensating for degradation of a reproduction signal caused by tilting, the cutoff frequency of the LPF 400 is determined to be five to ten times higher than a target compensation frequency band. Assuming that a tilt angle is in the range of ±1°, the number of turns of disc 10 is 43 Hz, a tilt allowance is ±0.6°, and the compensation frequency band of a tilt error correct part is about 200–300 Hz, the cutoff frequency of the LPF 400 becomes 1–3 kHz.

As shown in FIG. 17B, when the signal processor 50, 250 or 300 includes the envelope or middle level detector 450 at the output end thereof, a tilt error signal can be detected under a no tracking servo operation. In particular, although a tracking servo is not operated to correct for a tracking error, the output signal from the signal processor 50, 250 or 300 includes a relatively high-frequency tracking error signal component and a relatively low-frequency tilt error signal. Thus, if the envelope detector 450 is installed at the output end of the signal processor 50, 250 or 300, the envelope of the output signal, i.e., a relatively low-frequency tilt error signal, can be detected.

Alternatively, the envelope or middle level detector 450 to detect the middle level between peaks of a tracking error signal can be installed at the output end of the signal processor 50, 250 or 300. The middle level variations of the tracking error signal corresponds to a tilt error signal component, i,e, the envelope signal.

Figure 18:
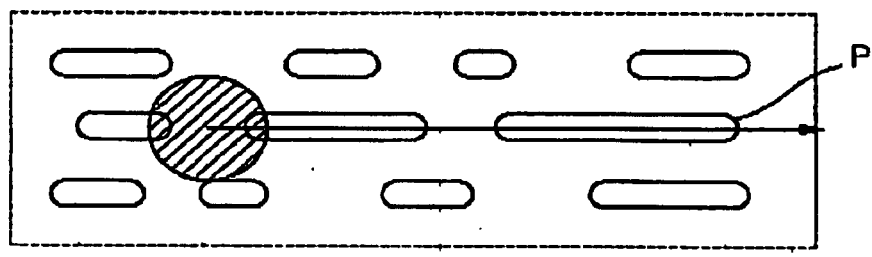
FIG. 18 illustrates a part of a recording medium having pits, which is used to detect a tilt error signal by an error signal detection apparatus according to the present invention.
Figure 19:
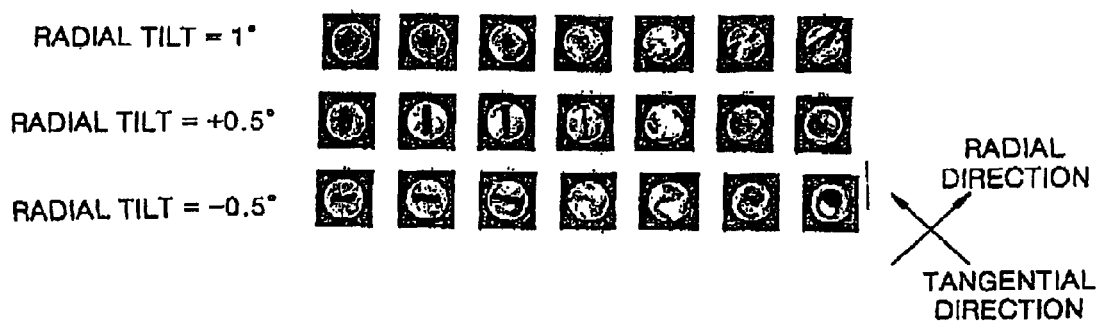
FIG. 19 shows the profile of light received by a photodetector according to radial tilt between the recording medium of FIG. 18 and an objective lens.

For the above-mentioned preferred embodiments of the error signal detection apparatus for an optical recording/reproducing system according to the present invention, a ROM type recording medium having pits P, as shown in FIG. 18, is adopted and a tilt error signal is detected under tracking servo operation. The profile (having a pattern like a baseball) of light received by the photodetector 40 varies according to the relative radial tilt between the objective lens and the recording medium, as shown in FIG. 19. FIG. 19 illustrates the profiles of light received the photodetector 40 on on-track positions at 0°, +0.5° and −0.5° radial tilts.

In the above-mentioned preferred embodiments of the error signal detection apparatus according to the present invention, assuming that tilt error signal levels detected at +1° and −1° radial tilts with respect to a reference level are v1 and v2, respectively, the tilt error signal detected in the on-track state satisfies that the maximum absolute value of (v1−v2)/(v1+v2) is 0.2 or less.

Assuming that the tilt error signal levels detected at +1° and −1° radial tilts with respect to a reference level are v3 and v4, respectively, the tilt error signal detected satisfies the minimum absolute value of v3 or v4 is about 50% of a tracking error signal level detected in the off track state by phase comparison.

The reference level, i.e., of a tilt error signal, is determined using one of signals or a combination of signals output when an information signal reproduced from the recording medium has a maximum level, when an information signal reproduced from the recording medium has a minimum jitter level, when a decoding error signal output from a decoding block, which decodes an information signal from the recording medium, has a minimum level, or when a specific signal pattern, such as sector sync, detected by the decoding block, has good profile.

In the preferred embodiments of the error signal detection apparatus according to the present invention, the phase comparators may be designed such that they perform their own phase comparison function by amplifying or cutting off the frequencies of input signals, digitizing the input signals, comparing the phases of the digitized input signals, and integrating a phase comparison signal.

As previously mentioned, a radial tilt error signal can be detected by the embodiments of the error signal detection apparatus according to the present invention. It will be appreciated that the error signal detection apparatus according to the present invention can be applied to optical recording/reproducing systems for RAM type media such as a HD-DVD RAM, as well as for ROM type media such as an HD-DVD ROM.

Although, in the preferred embodiments of the error signal detection apparatus for an optical recording/reproducing system according to the present invention, the photodetector 40 having 8 rectangular sections with a constant width, i.e., having a pair of inner and outer sections in each of the four light receiving portions, is illustrated, it will be apparent that the photodetector 40 can be divided into sections in a variety of forms.

For example, as shown in FIG. 20, a photodetector 140 having a pair of inner and outer sections in each of the light receiving portions 40a, 40b, 40c and 40d, in which the width of each of the inner and outer sections in the radial direction varies in the tangential direction of the recording medium, can be adopted. Although the photodetector 140 of FIG. 20 is designed such that the widths of the sections vary along curved lines, it will be apparent that the widths of the sections vary along straight lines rather than curved lines.

Alternatively, as shown in FIG. 21, a photodetector 240 can be designed such that the first through fourth light receiving portions 40a, 40b, 40c and 40d are separated from each other by a distance d in the tangential direction and/or radial direction. It will be apparent that the photodetector 140 of FIG. 20 can be constructed such that the first through fourth light receiving portions 40a, 40b, 40c and 40d are separated from each other by a predetermined distance in the tangential and/or radial direction.

As previously described, the error signal detection apparatuses for an optical recording/reproducing system according to the present invention can detect a tilt error signal having a high S/N, so that the tilt error signal is less affected by noise originating from the outside. The effect of detracking on the tilt error signal can be suppressed. In addition, if a detrack component is eliminated using a tracking error signal, a tilt error signal can be more accurately detected.

When the error signal detection apparatuses according to the present invention is applied to a high-density optical recording/reproducing apparatus adopting a short wavelength light source and a high NA objective lens to adjust a relative tilt between the objective lens and the recording medium, deterioration of a recording/reproduction signal, due to coma aberration caused by a relative tilt between the objective lens and the recording medium, can be prevented.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An error signal detection method for an optical recording/reproducing system, the method comprising:

(a) detecting a light incident through an objective lens after having been reflected and diffracted from a recording medium, as eight light portions arranged in a 2×4 matrix, including four inner light portions, and four outer light portions around corresponding inner light portions, wherein a row and a column of the matrix are parallel to a tangential and a radial direction of the recording medium, respectively;

(b) calculating a first sum signal by summing a detection signal from one of the outer light portions located in a first diagonal direction, and a detection signal from one of the inner light portions located in a second diagonal direction;

(c) calculating a second sum signal by summing a detection signal from one of the inner light portions located in the first diagonal direction, and a detection signal from one of the outer light portions located in the second diagonal direction;

(d) comparing phases of the first and second sum signals and outputting a phase comparison signal, and detecting a tilt error signal from the phase comparison signal.

2. The method of claim 1, wherein, in step (b), a pair of first sum signals are obtained by summing the detection signal from one of the outer light portions located in the first diagonal direction and the detection signal from the inner light portion located in the second diagonal direction, and by summing a detection signal from another one of the outer light portions located in the first diagonal direction and a detection signal from another one of the inner light portions located in the second diagonal direction; and in step (c), a pair of second sum signals are obtained by summing the detection signal from the outer light portion located in the second diagonal direction and the detection signal from the inner light portion located in the first diagonal direction, and by summing a detection signal from another one of the outer light portions located in the second diagonal direction and a detection signal from another one of the inner light portions located in the first diagonal direction; and in step (d), phases of the pair of the first sum signals are compared with each other, and phases of the pair of the second sum signals are compared with each other, to output a pair of phase comparison signals, and the pair of the phase comparison signals are summed.

3. The method of claim 2, further comprising amplifying the detection signals from the inner light portions by a predetermined gain factor before summation with the detection signals from the outer light portions.

4. The method of claim 2, further comprising:
(e) comparing a phase of a third sum signal of the detection signals from the inner and the outer light portions located in the first diagonal direction with a phase of a fourth sum signal of the detection signals from the inner and the outer light portions located in the second diagonal direction, to detect a tracking error signal; and
(f) subtracting the tracking error signal from the tilt error signal, so that a detrack component is eliminated from the tilt error signal.

5. The method of claim 1, wherein, in step (b), the first sum signal is obtained by summing detection signals from a pair of the outer light portions located in the first diagonal direction and from a pair of the inner light portions located in the second diagonal direction; and, in step (c), the second sum signal is obtained by summing detection signals from a pair of the inner light portions located in the first diagonal direction and from a pair of the outer light portions located in the second diagonal direction; and in step (d), the phases of the first and second sum signals are compared with each other to output the phase comparison signal.

6. The method of claim 5, wherein step (d) further comprises delaying the first or second sum signal prior to comparing the phases of the first and second sum signals.

7. The method of claim 5, further comprising amplifying the detection signals from the inner light portions by a predetermined gain factor before summation with the detection signals from the outer light portions.

8. The method of claim 5, further comprising:
(e) comparing a phase of a third sum signal of the detection signals from the inner and the outer light portions located in the first diagonal direction with a phase of a fourth sum signal of the detection signals from the inner and the outer light portions located in the second diagonal direction, to detect a tracking error signal; and
(f) subtracting the tracking error signal from the tilt error signal, so that a detrack component is eliminated from the tilt error signal.

9. The method of claim 1, further comprising amplifying the detection signals from the inner light portions by a predetermined gain factor before summation with the detection signals from the outer light portions.

10. The method of claim 1, further comprising:
(e) comparing a phase of a third sum signal of the detection signals from the inner and the outer light portions located in the first diagonal direction with a phase of a fourth sum signal of the detection signals from the inner and the outer light portions located in the second diagonal direction, to detect a tracking error signal; and
(f) subtracting the tracking error signal from the tilt error signal, so that a detrack component is eliminated from the tilt error signal.

11. The method of claim 10, wherein step (f) further comprises amplifying the tilt error signal detected in step (d) or the tracking error signal detected in step (e) by a predetermined gain factor.

12. An error signal detection apparatus for an optical recording/reproducing system, comprising:
a photodetector to receive light incident from an objective lens after having been reflected and diffracted from a recording medium; and
a signal processor to detect an error signal by processing detection signals from the photodetector,
wherein the photodetector includes four inner and four outer sections arranged in a 2×4 matrix, to independently receive and photoelectrically convert the light incident from the objective lens, pairs of the inner and outer sections being arranged in radial direction of the recording medium, wherein a row and a column of the matrix are parallel to the radial and a tangential direction of the recording medium, respectively; and
the signal processor compares a phase of a sum of detection signals from one of the outer sections located in a first diagonal direction and from one of the inner sections located in a second diagonal direction, with a phase of a sum of detection signals from one of the outer sections arranged in the second diagonal direction and from an inner section arranged in the first diagonal direction, to output a phase comparison signal, and the signal processor detects a tilt error signal from the phase comparison signal.

13. The apparatus of claim 12, wherein the signal processor comprises:
a first phase comparator to receive a sum signal of detection signals from the one of the outer sections located in the first diagonal direction and from the one of the inner sections located in the second diagonal direction, and a sum signal of detection signals from one of the outer sections located in the second diagonal direction in a same row as the one of the outer sections in the first diagonal direction and from one of the inner sections located in the first diagonal direction, comparing phases of the received two sum signals, and outputting a first comparator phase comparison signal;
a second phase comparator to receive a sum signal of detection signals from another one of the outer sections located in the first diagonal direction and from another one of the inner sections located in the second diagonal direction, and a sum signal of detection signals from one of the outer sections located in the second diagonal direction in a same row as the another one of the outer sections in the first diagonal direction and from the other one of the inner sections located in the first diagonal direction, comparing phases of the received two sum signals, and outputting a second comparator phase comparison signal; and
an adder to sum the first and second phase comparator signals to generate the tilt error signal.

14. The apparatus of claim 13, wherein the signal processor further comprises a gain controller to amplify the detection signals from the inner sections by a predetermined gain factor, such that the amplified detection signals are summed with an unamplified one of the detection signals.

15. The apparatus of claim 13, wherein the phase comparison signal is used as a detrack signal indicating a degree of deviation of a light spot from a center of a track on the recording medium.

16. The apparatus of claim 13, further comprising:
a tracking error detector to detect a tracking error signal by comparing a phase of a sum signal of the detection signals from the inner and outer sections located in the first diagonal direction, with a phase of a sum signal of the detection signals from the inner and outer sections located in the second diagonal direction; and
a differential part to subtract the tracking error signal output from the tracking error detector from the phase comparison signal, so that a detrack component is eliminated from the tilt error signal.

17. The apparatus of claim 12, wherein the signal processor comprises a phase comparator to receive a first sum signal of detection signals from outer sections located in the first diagonal direction and from inner sections located in the second diagonal direction; to receive a second sum signal of detection signals from outer sections in the second diagonal direction and from inner sections located in the first diagonal direction; and to compare phases of the first and second sum signals to output the phase comparison signal.

18. The apparatus of claim 17, wherein the signal processor further comprises a delay at an input end of the phase comparator, the first or the second sum signal being input to the input end.

19. The apparatus of claim 17, wherein the signal processor further comprises a gain controller to amplify the detection signals from the inner sections by a predetermined gain factor, such that the amplified detection signals are summed an unamplified one of the detection signals.

20. The apparatus of claim 17, wherein the phase comparison signal is used as a detrack signal indicating a degree of deviation of a light spot from a center of a track on the recording medium.

21. The apparatus of claim 17, further comprising:
a tracking error detector to detect a tracking error signal by comparing a phase of a sum signal of the detection signals from the inner and outer sections located in the first diagonal direction, with a phase of a sum signal of the detection signals from the inner and outer sections located in the second diagonal direction; and
a differential part to subtract the tracking error signal output from the tracking error detector from the phase comparison signal, so that a detrack component is eliminated from the tilt error signal.

22. The apparatus of claim 12, wherein the signal processor further comprises a gain controller to amplify the detection signals from the inner sections by a predetermined gain factor, such that the amplified detection signals are summed with an unamplified one of the detection signals.

23. The apparatus of claim 12, wherein the phase comparison signal is used as a detrack signal indicating a degree of deviation of a light spot from a center of a track on the recording medium.

24. The apparatus of claim 12, further comprising a low pass filter at an output end of the signal processor, to low-pass-filter a received signal, so that a degree of relative tilting between the objective lens and the recording medium is detected regardless of tracking servo operation.

25. The apparatus of claim 12, further comprising a detector at an output end of the signal processor, to detect an envelope of a signal output from the signal processor, corresponding to a relative tilt between the objective lens and the recording medium, or to detect variations of a middle level of the phase comparison signal, so that the tilt error signal is detected under no tracking servo operation.

26. The apparatus of claim 12, further comprising:
a tracking error detector to detect a tracking error signal by comparing a phase of a sum signal of the detection signals from the inner and outer sections located in the first diagonal direction, with a phase of a sum signal of the detection signals from the inner and outer sections located in the second diagonal direction; and
a differential part to subtract the tracking error signal output from the tracking error detector from the phase comparison signal, so that a detrack component is eliminated from the tilt error signal.

27. The apparatus of claim 26, further comprising a gain controller between an output end of the tracking error detector or the signal processor, and an input end of the differential part.

28. The apparatus of claim 12, wherein a width of each of the inner and outer sections is constant, or varies in the tangential direction.

29. The apparatus of claim 28, wherein the inner sections of the photodetector receive about 10–80% of 0th order diffracted light of the light incident from the objective lens.

30. The apparatus of claim 12, wherein the inner sections of the photodetector receive 10–80% of 0th order diffracted light of the light incident from the objective lens.

31. The apparatus of claim 12, wherein four light receiving portions each including a pair of the inner and outer sections are separated from each other in the radial and/or tangential direction.

32. The apparatus of claim 31, wherein the first through fourth light receiving portions are separated from each other in the radial and/or tangential direction.

33. The apparatus of claim 12, wherein assuming that tilt error signal levels detected at +1° and −1° radial tilts with respect to a reference level are v1 and v2, respectively, the tilt error signal detected in an on-track state satisfies the maximum absolute value of (v1−v2)/(v1+v2) is 0.2 or less.

34. The apparatus of claim 12, wherein assuming that tilt error signal levels detected at +1° and −1° radial tilts with respect to a reference level are v3 and v3, respectively, the tilt error signal detected satisfies the minimum absolute value of v3 or v4 is about 50% of a tracking error signal level detected in an off-track state by phase comparison.

35. An error signal detection apparatus for an optical recording/reproducing system, comprising:
an objective lens through which light passes;
a first detector to detect the light incident from the objective lens, the first detector comprising a plurality of outer light portions and a plurality of inner light portions inside of the outer light portions; and
a signal processor comprising a first comparing unit to compare a phase of a sum of detection signals from one of the outer light portions located in a first diagonal direction and from one of the inner light portions located in a second diagonal direction, with a phase of a sum of detection signals from one of the outer light portions located in the second diagonal direction and from one of the inner light portions located in the first diagonal direction, to output a first comparison signal, the signal processor detecting a tilt error signal from the first comparison signal.

36. The apparatus of claim 35, wherein the signal processor further comprises a second comparing unit to compare a phase of a sum of detection signals from another one of the outer light portions located in the first diagonal direction and from another one of the inner light portions located in the second diagonal direction, with a phase of a sum of detection signals from another one of the outer sight portions located in the second diagonal direction and from another one of the inner light portions located in the first diagonal direction, to output a second phase comparison signal, the signal processor further detecting the tilt error signal from the second comparison signal.

37. The apparatus of claim 36, wherein the signal processor comprises an adding unit to add the first and second phase comparison signals to generate the tilt error signal.

38. The apparatus of claim 37, wherein the inner and outer light portions are located in a 2×4 matrix.

39. The apparatus of claim 38, wherein the one of the outer light portions located in the first diagonal direction and the one of the inner light portions located in the second diagonal direction are located in a same row.

40. The apparatus of claim 38, wherein the one of the outer light portions located in the first diagonal direction and the one of the inner light portions located in the second diagonal direction are located in different rows.

41. The apparatus of claim 38, further comprising:

a second detector to detect a tracking error signal from said first detector; and a subtracting unit to subtract the tracking error signal from the tilt error signal to generate the tilt error signal.

42. The apparatus of claim 41, wherein the second detector detects the tracking error signal by comparing a phase of a sum of the inner light portions in the first diagonal direction and the outer light portions in the first diagonal direction with a phase of a sum of the inner light portions in the second diagonal direction and the outer light portions in the second diagonal direction.

43. An error signal detection method for an optical recording/reproducing system, comprising:

detecting light incident from an objective lens as a plurality of outer light regions and a plurality of inner light regions inside of the outer light regions; and comparing a phase of a sum of detection signals from one of the outer light regions located in a first diagonal direction and from one of the inner light regions located in a second diagonal direction, with a phase of a sum of detection signals from one of the outer light regions located in the second diagonal direction and from one of the inner light regions located in the first diagonal direction, to output a first phase comparison signal, and detecting a tilt error signal from the first phase comparison signal.

44. The apparatus of claim 43, wherein the detecting of the tilt error signal further comprises comparing a phase of a sum of detection signals from another one of the outer light regions located in the first diagonal direction and from another one of the inner light regions located in the second diagonal direction, with a phase of a sum of detection signals from another one of the outer light regions located in the second diagonal direction and from another one of the inner light regions located in the first diagonal direction, to output a second phase comparison signal, the tilt error signal further being detected from the second phase comparison signal.

45. The apparatus of claim 44, wherein the detecting of the tilt error signal further comprises adding the first and second phase comparison signals.

* * * * *

UNITED STATES PATENT AND TRADEMARK OFFICE
CERTIFICATE OF CORRECTION

PATENT NO.     : 6,885,621 B2
DATED          : April 26, 2005
INVENTOR(S)    : Byung-in Ma et al.

It is certified that error appears in the above-identified patent and that said Letters Patent is hereby corrected as shown below:

Title page,
Item [57], ABSTRACT,
Line 23, change "detracting" to -- detracking --.

Column 16,
Line 65, change "claim 2" to -- claim 1 --.

Column 17,
Line 43, change "claim 1" to -- claim 2 --.

Column 20,
Line 54, change "sight" to -- light --.

Signed and Sealed this

Sixteenth Day of August, 2005

JON W. DUDAS
*Director of the United States Patent and Trademark Office*